(No Model.)
F. TROWBRIDGE.
CAR HEATER.
No. 381,512. Patented Apr. 17, 1888.
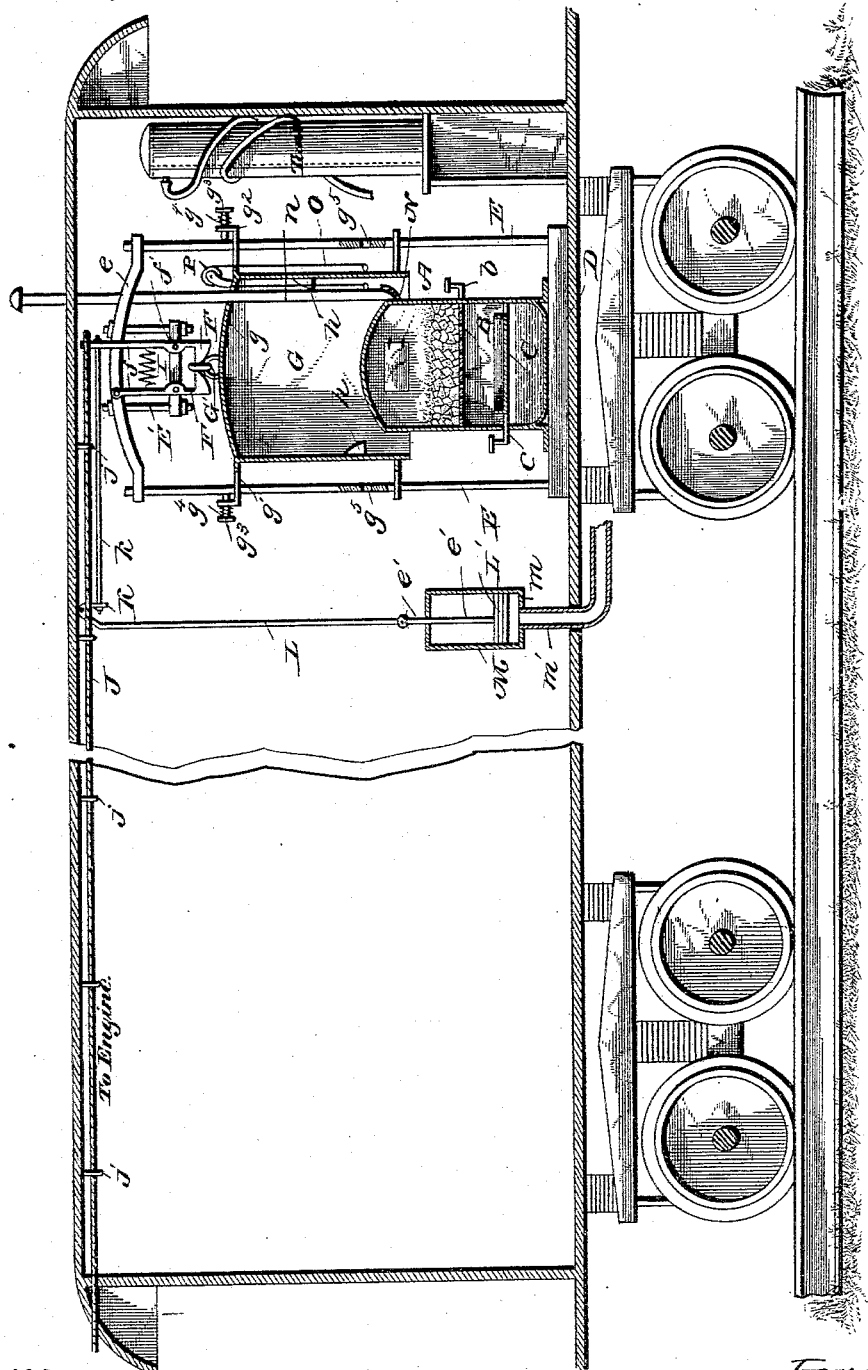
Witnesses:
Inventor:
Frank Trowbridge
By Edson Bros.
his Attorneys

UNITED STATES PATENT OFFICE.

FRANK TROWBRIDGE, OF FOND DU LAC, WISCONSIN, ASSIGNOR TO HOWARD T. SACKETT, OF SAME PLACE.

CAR-HEATER.

SPECIFICATION forming part of Letters Patent No. 381,512, dated April 17, 1888.

Application filed March 31, 1887. Serial No. 233,194. (No model.)

*To all whom it may concern:*

Be it known that I, FRANK TROWBRIDGE, a citizen of the United States, residing at Fond du Lac, in the county of Fond du Lac and State of Wisconsin, have invented certain new and useful Improvements in Car-Heaters; and I do declare the following to be a full, clear, and exact description of the invention, such as will enable others skilled in the art to which it appertains to make and use the same, reference being had to the accompanying drawing, and to the letters and figures of reference marked thereon, which form a part of this specification.

My invention relates to improvements in car-heaters; and it consists in the peculiar combination of devices and novel construction and arrangement of the various part for service, as will be hereinafter fully described, and particularly pointed out in the claims.

The primary object of my invention is to provide a heater for steam or railway cars with an improved cover which is adapted to entirely inclose the heater in the event of an accident to the car and operate the grate and ash-pan to dump the contents of the same into the extinguishing liquid or compound, to thereby completely extinguish the fire in the heater and effectually prevent the car from taking fire.

A further object of my invention is to provide means for normally suspending the cover above and out of contact with the heater, so that heat from the latter can be freely radiated without hinderance from the cover, to thereby render the car comfortable, and, further, to provide mechanism whereby the suspending means can be operated to release the cover at the will of the engineer, or by the brakeman or a passenger on the car.

A further object of my invention is to provide means for disengaging the stove-pipe from the heater simultaneously with the descent of the cover, so that the stove-pipe hole in the cover can be closed by suitable devices, which thus effectually prevent the escape of the contents of the heater in the event of an accident, as will be hereinafter fully described.

In the accompanying drawing the single figure represents a vertical sectional view through a portion of a heater embodying my invention, a portion of my invention being shown in elevation and the railway-car in section.

Referring to the drawing by letter, A designates the heater or stove embodying my invention, which is of any preferred or ordinary pattern. This stove or heater has a horizontal grate, B, which is pivoted or supported on trunnions in the heater, so as to be capable of swinging vertically therein to dump the fire, and this grate is further provided with a crank-arm, $b$, which passes through a suitable slot or opening in the shell of the heater, for a purpose presently described.

Below the grate is arranged a horizontal ash-pan, C, into which the ashes and live coals drop from the grate B. This ash-pan is supported or pivoted in a similar manner to the grate, so that the ash-pan is also capable of a swinging movement to empty the contents of the pan. This swinging ash-pan is also provided with a horizontal crank-arm, $c$, which projects through the shell or case of the heater, but on the side thereof opposite to the side through which the crank-arm of the grate projects, as clearly shown in the drawing.

Below the ash-pan and grate is arranged a tank or receptacle, D, which may be either fixed in the lower part of the heater or stove, as shown, or suitably supported so as to be easily and readily removed in the bottom of the car. This tank or receptacle is designed to be filled with or receive a body of water or other liquid or compound for extinguishing the fire in the grate and ash-pan where they are dumped, in the manner which I will presently describe.

Erected on opposite sides of the heater or stove are vertical guide-rods E, which are suitably fixed to the floor of the car, and the upper ends of these guide-rods are rigidly connected by a horizontal bar, $e$, which is rigidly affixed at its ends to the rods to brace the same, these guide-rods and the horizontal bar forming or constituting the supporting or main frame of my invention. Depending centrally from the fixed horizontal bar is a suitable hanger, E', which is rigidly fixed or secured to the said bar, and this hanger supports or carries the jaws F F', which suspend the vertically-movable cover G, which is arranged to telescope over the heater or stove A.

This heater is preferably cylindrical in form, and its lower end is open, as shown, while the upper end is closed by a head, $g$, so that when it drops and incloses the stove the contents of the latter cannot escape in the event of the heater being overturned during a collision or accident to the car. From opposite sides of the vertically-movable cover, at the upper and lower ends thereof, project suitable guide-arms, $g$ $g'$, which are rigidly secured to the cover, and have openings through which are passed the vertical guide-rods E, between which the cover is arranged, whereby the proper vertical movement of the cover is insured, and it is held or retained in position during its downward movement to inclose the heater with certainty.

From the outer extremities of the upper guide-arms, $g'$, project short vertical arms, through which are guided locking-pins $g^3$, which are normally impelled or forced rearwardly against the fixed guide-rods E by a coiled spring, $g^4$, said locking-pins being adapted to enter apertures $g^5$, formed in the guide-rods at or near the middle of the same, so that when the cover is lowered over the heater the pins automatically enter the openings, and thereby lock the cover against further vertical movement in either direction.

The jaws F F' extend or project inwardly toward each other, so that they meet, and the lower faces or edges of the jaws are inclined in reverse directions, so that a ring, $g'$, can pass readily between the jaws to be engaged thereby. This ring is connected to the head of the cover at the center thereof, and when it is engaged by the jaws the cover is suspended by the latter above and out of contact with the heater, so that the heat can be radiated from the heater without hinderance from the cover, which is thus arranged out of the way completely.

From opposite inner sides of the cover project operating lugs or shoulders $h$ $h'$, which are suitably fixed in place, and the crank-arms of the swinging grate and ash-pan are arranged in the paths of the operating-shoulders, to be struck thereby when the cover descends, and thereby turn the grate and pan to empty the contents of the same into the liquid or other compound in the tank, to thereby extinguish the fires. These operating lugs or shoulders are arranged one above the other a distance equal to the distance between the different planes of the crank-arms, in order that the arms may be struck simultaneously or at the same time, to thereby dump both the grate and pan at once; but, if desired, this arrangement of the operating lugs or shoulders may be varied to strike the crank-arms successively, or vice versa.

Each of the jaws F F' is further provided with extended arms or shanks $f$, the shank of the jaw F being fixed to the hanger, as shown, so that this jaw is immovably secured in place, while the shank of the jaw F' is pivoted at an intermediate point of its length to the hanger, as at $f'$, so that the latter jaw is movable toward and from the fixed jaws, to open and close the same, and thereby permit the ring of the cover to pass between and suspend from the jaws. The shank of the pivoted movable jaw is extended above the hanger and the fixed horizontal bar of the frame, and to this extended end of the shank is connected the means for operating the movable jaw to open and close the jaws. In order to hold the jaws closed and thereby prevent the accidental disengagement of the ring of the movable cover from the jaws, I provide a spring, I, which is preferably coiled and arranged between the shanks of the jaws, to thereby force the pivoted jaws toward the fixed jaw.

I have shown in the accompanying drawing two methods of operating the movable pivoted jaws; but I do not desire to confine myself to the particular mechanism for operating the jaw, as I am aware that it can be operated by electric connections with the locomotive.

To the extreme upper end of the shank of the pivoted jaw is connected one end of a pull rod or cord, J, which passes through suitable guides, $j$, in the roof of the car. This cord can be readily grasped and operated by the brakeman or a passenger to release the cover. I also provide steam-connection with the locomotive for operating the movable jaw, which consists of a horizontal operating-rod, $k$, which is pivoted at one end to the movable jaw and at its other end to one end of a bell-crank lever, K, which is suitably pivoted to the car. To the other end of the bell-crank lever is connected the upper end of a vertical operating-rod, L, which is connected at its lower end to a piston-rod, $e'$, of a piston, L', which reciprocates in a cylinder, M, which is suitably fixed or supported in place. Through the lower head, $m$, of this steam-cylinder opens a live-steam pipe, $m'$, which leads from the cylinder to the locomotive-cab under the floor of the car.

It will be noted that when live steam is admitted to the supply-pipe it enters the cylinder beneath the piston-head, upon which it exerts sufficient pressure to raise the piston and thereby turn the bell-crank lever, which in turn operates the pivoted jaw and thereby releases the cover, which falls or drops by gravity.

From one side of the heater or stove projects a socket, N, in which is fitted the lower extremity of the smoke-escape pipe $n$, which is arranged within the cover on one side thereof, and passes through vertical openings in the head of the cover and roof of the car. To the lower end of this smoke-pipe is connected a cord or chain, $o$, which passes upwardly through the head of the cover and over a pulley, P, which is journaled in a bracket, $p$, fixed to one of the vertical guide-rods at a point thereon above the cover when the latter is elevated. The opposite or free end of the cord is connected to the cover, so that as the latter descends the end of the cord connected to the cover will be drawn down with it and the opposite end connected to the stove-pipe will be elevated a corresponding distance, and thereby raise the stove-pipe simultaneously with the descent of the cover. By thus disengaging the stove-pipe from the heater and raising it above the cover the hole in the latter through which the pipe passes can be readily closed by suitable devices, (not shown,) which are arranged to automatically cover the stove-pipe hole, and thus prevent the escape of the contents of the heater.

This being the construction of my invention, the operation thereof is as follows: The jaws are normally forced together by the spring, and the ring fits over and between the jaws, so as to suspend the cover above and out of contact with the stove. To drop the cover over the stove or heater, the pull-cord is pulled or steam admitted to the cylinder to throw the bell-crank lever and thereby move the pivoted jaw against the tension of the spring, which thus permits the cover to fall or drop by gravity, the downward movement of the cover being guided by the guide-rods simultaneously with the descent of the cover, and the operating-lugs of the cover strike the crank-arms $b\ c$, and thereby turn the grate and ash-pan and empty the contents of the same into the tank, where the fire is effectually extinguished, the cover being locked in place over the heater by the spring-pressed pins entering the apertures in the guide-rod. To reset the apparatus it is only necessary to withdraw the locking-pins from the apertures in the guide-rods, elevate the cover, and force or slip the ring of the same between the jaws, which instantly close and suspend the cover in position over the stove; the upward movement of the cover serving to draw the stove-pipe down into position again.

I would state that while I deem the mechanisms and devices herein shown and described as best adapted for carrying my invention into effect, still I would have it understood that I do not desire to confine myself to the exact details of construction and arrangement, but hold myself at liberty to make such changes and alterations as fairly fall within the scope of my invention.

Having thus fully described my invention, what I claim as new, and desire to secure by Letters Patent of the United States, is—

1. A car-heater having a swinging grate provided with a crank-arm, in combination with a vertically-movable cover adapted to strike the crank-arm when it descends, to thereby turn the grate, as and for the purpose described.

2. A car-heater having the swinging grate and ash-pan arranged one below the other, and each having a crank-arm, in combination with a vertically-movable cover adapted to completely inclose the heater, and having the independent operating lugs or shoulders arranged in the paths of the crank-arms to strike the latter during the descent of the cover, as and for the purpose described.

3. The combination, with a heater and a vertically-movable cover adapted to inclose the heater, of a swinging grate supported in the heater and a swinging ash-pan, also supported in the heater on a plane below the grate, said grate and ash-pan each having a crank-arm arranged in the path of the cover, to be struck by the latter when it descends, as and for the purpose described.

4. The combination, with a car-heater, of a vertically-movable cover adapted to completely inclose the heater, fixed guide-rods arranged exteriorly to the heater and cover, arms fixed to the cover and fitted over the guide-rods, and automatic catches carried by the cover and adapted to engage the guide-rods to lock the cover to the latter, as and for the purpose described.

5. In a car-heater, the combination of the fixed guide-rods, the vertically-movable cover having the guide-arms fitted over the rods and fixed to the cover, and the spring-controlled locking-pins carried by the guide-arms, substantially as described.

6. In a car-heater, the combination of the vertical guide-rods, a vertically-movable cover connected to said rods, to be guided thereby, a pair of jaws supported by the rods above the position occupied by the cover when elevated, and spring-catches carried by the cover, which are automatically locked to the guide-rods when the cover is lowered to inclose the heater, as and for the purpose described.

7. In a car-heater, the combination, with a vertically-movable cover having inwardly-projecting lugs or shoulders at different elevations, of a swinging grate provided with a crank-arm arranged in the path of one of the lugs, a swinging ash-pan arranged below the grate and likewise having a crank-arm disposed in the path of the other lug, and a fixed tank arranged below the ash-pan and grate, to receive the contents of the same when they are turned, as and for the purpose described.

8. In a car-heater, the combination of a vertically-movable cover, a pulley supported in a fixed bracket above the cover, the smoke-pipe fitted in a socket in the heater, and a cord passing over the pulley and connected at its ends to the cover and smoke-pipe, substantially as described, for the purpose set forth.

In testimony whereof I affix my signature in presence of two witnesses.

FRANK TROWBRIDGE.

Witnesses:
 JAMES T. GREENE,
 H. T. SACKETT.